No. 773,270. PATENTED OCT. 25, 1904.
E. J. YEARLY.
FORK ATTACHMENT.
APPLICATION FILED FEB. 6, 1904.
NO MODEL.
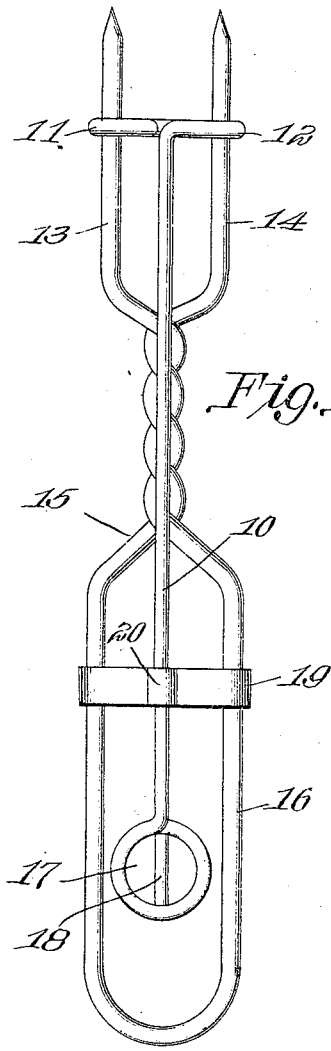
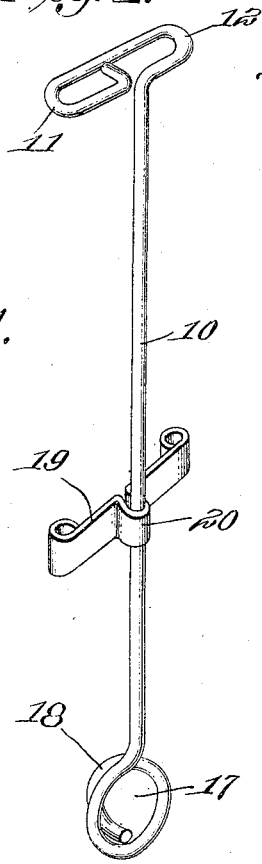
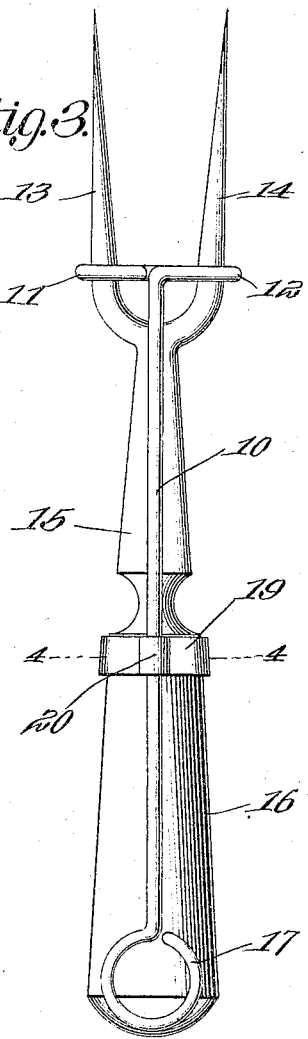
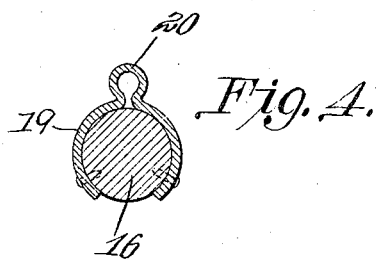
Witnesses
E. J. Stewart
C. N. Woodward
Edward J. Yearly, Inventor.
by C. A. Snow & Co.
Attorneys No. 773,270. Patented October 25, 1904.

UNITED STATES PATENT OFFICE.

EDWARD J. YEARLY, OF BURLINGTON, NEW JERSEY, ASSIGNOR OF ONE-HALF TO MICHAEL J. GRAY, OF BURLINGTON, NEW JERSEY.

FORK ATTACHMENT.

SPECIFICATION forming part of Letters Patent No. 773,270, dated October 25, 1904.

Application filed February 6, 1904. Serial No. 192,401. (No model.)

*To all whom it may concern:*

Be it known that I, EDWARD J. YEARLY, a citizen of the United States, residing at Burlington, in the county of Burlington and State of New Jersey, have invented a new and useful Fork Attachment, of which the following is a specification.

This invention relates to attachments employed in carving and in cooking operations for detaching adhering portions of food therefrom, and has for its object to simplify and improve the construction and produce a device of this character which may be readily applied to the different forms of forks in use and which may be operated by one of the fingers of the hand which holds the fork.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claim made therefor.

In the drawings thus employed, Figure 1 is a plan view of an ordinary cooking-fork with the attachment applied. Fig. 2 is a perspective view of the attachment removed. Fig. 3 is a view of an ordinary carving-fork with the improved attachment applied. Fig. 4 is a transverse section on the line 4 4 of Fig. 3.

The improved attachment consists of a bar or stock 10, having at one end oppositely-extending lateral loops 11 12, slidably engaging the tines 13 14 of the fork 15 and extending longitudinally of the handle portion 16 and terminating in a finger-receiving loop or socket 17. The loop portion 17 when employed upon the form of fork shown in Fig. 1 will be provided with a stop extension 18 to prevent the finger being protruded too far through the loop and adding to the efficacy of the operation. The handle portion 16 is provided with a guide-clip 19, through which the bar 10 operates and by means of which it is guided.

The bar 10 and its loops 11 12 and eye or socket 17 18 will preferably be formed of a single piece of wire bent into the required shape and of a size sufficient to withstand the strains to which it will be subjected. The clip member 19 will preferably be in the form of a band, as in Figs. 1 and 2, and when employed upon carving or other forms of forks having the ordinary wood, horn, ivory, or other similar handles will be secured thereto, as by screws 20. The guides 19 will be provided with an eye 20, through which the bar 10 is guided.

By this simple arrangement it will be obvious that by a simple movement of the index-finger of the hand which holds the fork the loops 11 12 will be caused to move longitudinally of the tines 13 14 and force any adhering object therefrom. The whole action can thus be accomplished by the same hand which holds the fork.

The improved implement will be very convenient for use in kitchens for handling and testing various articles of food and will also be found very useful in carving and serving meats, poultry, vegetables, and the like at the table and preventing the annoyance arising from portions of food adhering to the fork.

The attachment may be plated or polished to conform to the other metal portions of the fork and will not detract from the pleasing appearance of the implement.

Having thus described the invention, what is claimed is—

A fork attachment comprising a clip having an eye, and a stem slidable endwise through the eye and terminating at one end in a handle, its opposite end being bent into a loop projected at opposite sides of the stem and lying in a plane at substantially right angles thereto, said loop being offset wholly upon one side of the stem and opposite the eye of the clip, the clip being formed for connection with the handle of a fork, and the loop of the stem being formed to slidably embrace the tines of a fork to form a clearance device therefor.

In testimony that I claim the foregoing as my own I have hereto affixed my signature in the presence of two witnesses.

EDWARD J. YEARLY.

Witnesses:
FRANKLIN C. WOOLMAN,
P. W. SMITH.